(12) United States Patent
Lacasse et al.

(10) Patent No.: US 9,834,475 B2
(45) Date of Patent: Dec. 5, 2017

(54) METHOD OF FILLING A SUBSTRATE HAVING A SELECTED PLURALITY OF CHANNELS WITH A GRANULAR MATERIAL

(71) Applicants: Maurice Lacasse, Stoke (CA); Luc Desrosiers, Sherbrooke (CA)

(72) Inventors: Maurice Lacasse, Stoke (CA); Luc Desrosiers, Sherbrooke (CA)

(73) Assignee: Pyrotek, Inc., Spokane, WA (US)

( * ) Notice: Subject to any disclaimer, the term of this patent is extended or adjusted under 35 U.S.C. 154(b) by 234 days.

(21) Appl. No.: 14/643,562

(22) Filed: Mar. 10, 2015

(65) Prior Publication Data

US 2015/0307395 A1 Oct. 29, 2015

Related U.S. Application Data

(63) Continuation-in-part of application No. 14/261,048, filed on Apr. 24, 2014.

(51) Int. Cl.
| | | |
|---|---|---|
| *C04B 7/24* | (2006.01) | |
| *B05D 7/22* | (2006.01) | |
| *C04B 35/64* | (2006.01) | |
| *C04B 35/01* | (2006.01) | |
| *C04B 30/00* | (2006.01) | |
| *C04B 111/00* | (2006.01) | |

(52) U.S. Cl.
CPC .............. *C04B 7/243* (2013.01); *C04B 30/00* (2013.01); *C04B 35/01* (2013.01); *C04B 35/64* (2013.01); *C04B 2111/00431* (2013.01); *C04B 2111/00551* (2013.01); *C04B 2111/00793* (2013.01); *C04B 2201/32* (2013.01); *Y02W 30/92* (2015.05)

(58) Field of Classification Search
CPC .......... B05D 7/22; B05D 7/24; B05D 3/0254; C04B 7/243
See application file for complete search history.

(56) References Cited

U.S. PATENT DOCUMENTS

| | | | |
|---|---|---|---|
| 4,433,845 A | | 2/1984 | Shiembob |
| 4,769,348 A | | 9/1988 | O'Holleran |
| 4,833,025 A | | 5/1989 | Rossi |
| 4,963,515 A | * | 10/1990 | Helferich ................ C04B 35/18 104/75 |
| 5,360,771 A | | 11/1994 | Delvaux |
| (Continued) | | | |

FOREIGN PATENT DOCUMENTS

| | | |
|---|---|---|
| CN | 102059736 B | 10/2012 |
| WO | 2010022507 A1 | 3/2010 |

OTHER PUBLICATIONS

PCT Search Report from PCT/US2016/021690, dated Aug. 8, 2016.

*Primary Examiner* — Xiao S Zhao
(74) *Attorney, Agent, or Firm* — Fay Sharpe LLP

(57) ABSTRACT

The method is for use with a substrate having a plurality of parallel channels extending therethrough. In the method, the steps comprise: filling a selected plurality of the channels with a granular material; and consolidating the granular material through heat. The selected plurality of channels is selected to produce a wall that separates the substrate into: a first portion having a first plurality of the parallel channels extending therethrough; and a second portion having a second plurality of the parallel channels extending therethrough.

12 Claims, 1 Drawing Sheet

(56) References Cited

U.S. PATENT DOCUMENTS

| | | | |
|---|---|---|---|
| 5,869,407 A | 2/1999 | Rusek, Jr. et al. | |
| 7,083,758 B2 | 8/2006 | Tremblay | |
| 2005/0116398 A1* | 6/2005 | Tremblay | F27D 1/0006 |
| | | | 266/280 |

* cited by examiner

METHOD OF FILLING A SUBSTRATE HAVING A SELECTED PLURALITY OF CHANNELS WITH A GRANULAR MATERIAL

This application is a continuation-in-part filing of U.S. application Ser. No. 14/261,048, filed Apr. 24, 2014, the disclosure of which is herein incorporated by reference.

BACKGROUND OF THE INVENTION

In the aluminum industry, it is a common practice to convey aluminum in insulated troughs or filter boxes comprising a steel shell in which a refractory working lining is mounted to resist molten aluminum attack. Because the refractory working lining is usually quite thermally conductive, a good insulating material has to be placed between the refractory working lining and the steel shell to reduce heat losses. Such an insulating material can be called "back-up insulating material", alternatively referred to herein as insulation material and/or granular material.

An example of an insulation material presently in use is sold under the trademark WOLLITE®. This material which forms the subject matter of U.S. Pat. No. 5,360,771, the disclosure of which is herein incorporated by reference, is a solid, light weight mineral foam obtained by reaction of a wollastonite suspension containing a small quantity of calcium carbonate with a phosphoric acid solution. In addition, E-ZPOUR™ by RexRoto, a non-free flowing vermiculite powder, has been used as an insulating material.

Free flowing granular insulation materials also can be used in a catalytic converter apparatus for use in an exhaust system of an internal combustion engine. The converter includes: a housing, the housing including a gas inlet and a gas outlet; and at least one substrate element arranged in the housing, the at least one substrate element including catalytic material, the at least one substrate element divided into a plurality of zones, each of the zones defining a generally separate flow passage connecting the inlet and the outlet in fluid communication. A granular insulation can be used to form at least one wall at least partially separating the plurality of zones.

A method of reducing emissions from an internal combustion engine can include providing the catalytic converter apparatus as described above and placing the inlet of the apparatus in fluid communication with an exhaust gas stream of the engine

SUMMARY OF THE INVENTION

According to a first embodiment of the disclosure, a method of forming an insulating material is provided. The method includes the steps of a) mixing from about 65 to 85% by weight of fly-ash with from about 15 to 35% by weight of a heat sensitive binder; and b) casting the mixture obtained in step (a), and c) firing the casting to at least about 800° C.

According to a second embodiment, a free flowing insulating material having a thermal conductivity ranging between about 0.8 and about 1.8 BTUin/ft$^2$·hr° F. is provided. The material comprises: a) from about 65 to 85% by weight fly-ash cenospheres, b) from about 2 to 15% by weight of a heat sensitive binder; c) from 0 to about 7% by weight of a non-wetting agent selected from the group consisting of calcium fluoride, magnesium fluoride and barium sulphate; d) from 0 to about 10% by weight of a heat expandable material selected from the group consisting of vermiculite and graphite; and e) from 0 to about 1% by weight of a dust suppressant. The insulating material can have a flexural strength (CMOR) greater than about 200 psi. In some instances, the CMOR can be at least about 400 psi, or even 500 psi.

According to a further embodiment of this disclosure, a granular material from about 65 to 85% by weight of fly-ash and from about 15 to 35% by weight of a heat sensitive binder is provided.

According to another aspect of the disclosure, the insulation material can comprise about 80% by weight of a fly-ash comprising cenospheres; and about 20% by weight of the heat sensitive binder.

According to another aspect of the disclosure, the heat sensitive binder can be boric acid or anhydrous boron oxide.

According to another aspect of the disclosure, the granular material can have a density of from 25 to 30 lb/ft$^3$. In certain embodiments, the density is at least 29 lb/ft$^3$.

According to another aspect of the disclosure, the granular material can have a median particle size of approximately 50 microns and a particle size ranging from 10 to 500 microns.

Forming another aspect of the disclosure is a method for use with a substrate having a plurality of parallel channels extending there through. The method includes the steps of filling a selected plurality of the channels with a granular material manufactured in accord with the preceding paragraphs the selected granular material being arranged to produce a wall that separates the substrate into: a first portion having a first plurality of the parallel channels extending there through; and a second portion having a second plurality of the parallel channels extending there through.

According to another aspect of the disclosure, the granular material can be sintered to form the wall.

According to another aspect of the disclosure, the filling step can involve pouring the granular material into a plurality of cells.

According to another aspect of the disclosure, the granular material can be vibrated during the filling process.

According to another aspect of the disclosure, the vibration to which the granular is subjected to during the filling step can have an amplitude of about 10 millimeters and a speed of about 3 inch per second RMS.

Further advantages and characteristics of the present invention will become apparent upon review of the following detailed description and the appended drawings, the latter being briefly described hereinafter.

DETAILED DESCRIPTION

Figures 1, 2:
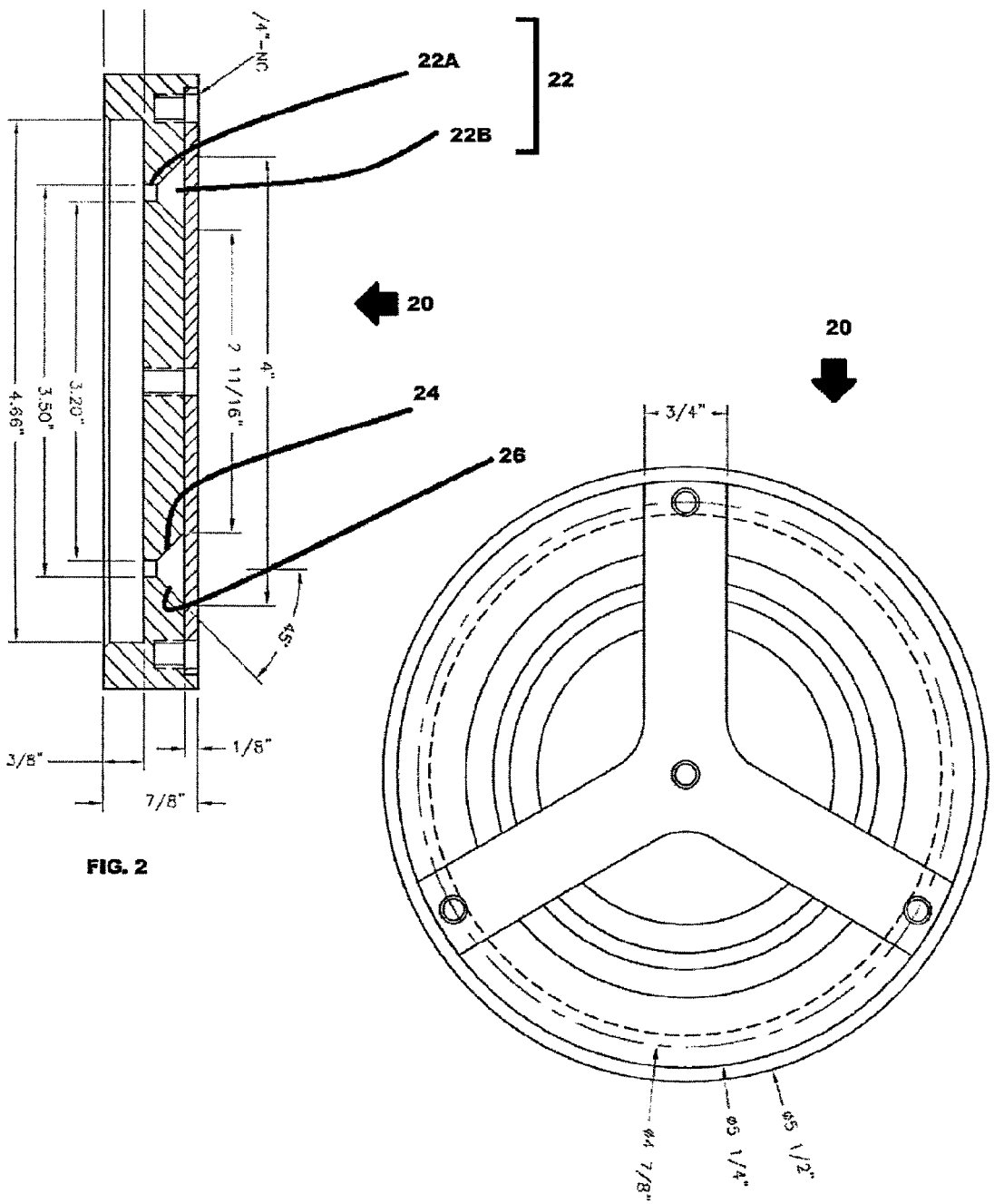
FIG. 1 is a plan view of a mask used in an exemplary embodiment of the method.
FIG. 2 is a side view of the mask of FIG. 1.

The insulation material can be made from a mixture of "fly-ash", a heat sensitive binder, and optionally a non-wetting agent. The material may also include a heat expandable material and a dust suppressant.

"Fly-ash" is a known coal combustion by-product produced in coal fired utilities. It is usually in the form of ceramic hollow microspheres (also called "cenospheres"), which are formed during the burning of coal. These cenospheres basically consists of silica (SiO$_2$) and alumina (Al$_2$O$_3$) and include nitrogen and/or other gases within their cavities.

The heat sensitive binder can be any kind of binder known to have a low sintering temperature. Boric acid and anhydrous boric oxide are examples of suitable binders.

The optional non-wetting agent can be any kind of agent known to have this property. Examples of such non-wetting agent include calcium fluoride, magnesium fluoride and barium sulfate.

The heat expandable material that is optionally used in the composition can be vermiculite or graphite.

The dust suppressant that is also optionally used in the composition can be any kind of product known to have such a property. Examples of a dust suppressant include kerosene, mineral oils and vegetable oils.

In use, the components employed are in the form of microspheres and powders, and are mixed together and formed into the desired insulation structure or fed into the structure for which insulation is required.

As examples, the insulation material could be used with structures for which insulation is required such as troughs, crucibles and filter assemblies as used in the aluminum, steel, or the glass industry, or as a separation member for a catalytic converter.

A suitable insulation material has the composition between about 65 and 85%, for example about 80%, by weight of fly-ash comprising cenospheres, about 15 to 35%, such as 20%, by weight of binder, and has a median particle size of approximately 50 microns and a particle size ranging from 10 to 500 microns.

In use, these components are mixed together and cast under vibration into a thermally conductive mold. The mold is then placed in an oven to reach about 400° C. After that the mold is cooled down, the insulating material is unmolded. At this stage the insulation material is hard enough to be manipulated and can be machined to any desired shape. The insulating material, shaped or unshaped, is then fired from about 800 to 1000° C. Surprisingly, when the material is fired above 800° C., 850° C., 900° C., or even 950° C. there is a sharp increase of properties like CMOR and the granular material becomes hydrophobic. This is particularly advantageous for molten metal application where moisture can be a safety problem.

The insulating material according to the disclosure has numerous advantages:
  a density from 25 to 30 lb/cu. ft.
  a flexural strength (CMOR) from 200 to 550 psi
  a compressive strength (CCS) from 350 to 550 psi
  a thermal conductivity of 1.0 BTU·in/ft$^2$·hr·° F.
  smooth surface as particle sizes are within 10 to 500 microns
  no moisture pick-up under high relative humidity
  no organic binder
  easily cut and shaped with standard machine tools It is also possible to add to the composition high temperature fiber or fabric for reinforcement.

The following examples are presented to better explain the invention:

Example 1

A composition of 80% by weight of fly ash Fillite 106 from Tolsa USA Inc. was mixed with 20% by weight of boric acid Optibor from U.S. Borax in a Hobart mixer until homogenisation of the mix.

The mix was cast into a steel mold having 5 cavities of 2"×2"×8" and vibrated until the material was well distributed into all the cavities.

The steel mold and the mix was placed into an oven to a temperature of 400° C. to get first set of the material.

When cool, the 5 bars were unmolded and then placed into an oven to reach a temperature of 950° C. with a rate increase of 50° C./hr and then held at 950° C. for 16 hr before cool down.

The same procedure was followed but fired at 750° C.
The same procedure was followed but fired at 850° C.

All the bars were tested for density and CMOR. Results are presented in the following table:

| Temperature | Density (lb/cu.ft.) | CMOR (psi) |
| --- | --- | --- |
| 750 C. | 28.7 | 307 |
| 850 C. | 29.3 | 399 |
| 950 C. | 30.0 | 526 |

Example 2

A cube of 2" was cut out of one bar from example 1, fired at 750° C., 850° C. and 950° C. respectively.

These cubes were placed into a humidity cabinet type Blue M and attached to a weight scale located on the top of the cabinet.

The temperature was maintained at 25° C. and a relative humidity maintained at 75% for a period of 72 hours.

The weight gain was recorded for the duration of the experiment and results are presented in the following table:

| Temperature | Weight gain (% w/w) |
| --- | --- |
| 750 C. | 6.0 |
| 850 C. | 0.0 |
| 950 C. | 0.0 |

The insulating material may be cast to get different shapes. For example, molten metal processing equipment may be formed. It is also possible to cast into a honeycomb catalyst (acting as a mold) to insulate it as described in patent publication WO 2010/022507, the disclosure of which is herein incorporated by reference.

When the material is used to form a catalytic converter, one of the parallel faces of the substrate is placed upon a rubber seal, an aluminum mask having a slit defined there through is placed upon the opposing face such that the slit lies upon the notional wall and granular material is poured upon the mask while the mask, honeycomb substrate and seal are vibrated as a unit with a vibration having an amplitude of about 10 millimeters and a speed of about 3 inch per second RMS.

A suitable mask 20 is shown in FIG. 1 and FIG. 2 and will be seen to have a slit 22 having a narrow (0.15" thick) bottom 22A and a broad (17/32") top 22B, thereby defining an elongate funnel adapted such that granular material poured upon the mask is directed towards the interior of the notional wall. Use of this mask in the manner contemplated above provides for relatively quick filling of both 900 cpi and 400 cpi bricks; for example, conventional 4.23" high bricks can be filled in 30 seconds.

In the consolidation step, the granular material is heat sintered to produce a wall of insulation corresponding in size to the notional wall. It has been found that a suitable sintering regime involves elevating the temperature of the granular material to 950° C. at a rate of 200° C./hour and then allowing the heated product to cool to ambient temperature at 200° C./hour.

In the sealing step, the ends of the insulated wall are sealed with a material that is adapted to reduce absorption of the catalyst in any subsequent wash coating step carried out on the substrate/wall combination and that is ideally adapted to dissipate during the curing of the catalyst coating. Selection of a sealant suitable for this purpose is a matter of routine for persons of ordinary skill in the art and accordingly further detail is neither provided nor described. The result of the sealing step is the production of an insulated catalytic substrate as described in PCT/CA2009/001187. Such an insulated substrate can be wash coated with a catalyst in any conventional manner Wash coating forms no part of the present invention and thus is not further described.

Whereas but a single embodiment is herein described in detail, variations are possible. For example, whereas a specific granular material is described, it is contemplated that other materials might be utilized. As well, whereas a specific mask is shown, other masks can be utilized. For example, whereas the elongate funnel shown has primary walls 24, 26 disposed a 90° to one another, this is not required.

Further, whereas a specific sintering regime is described, sintering of granular material of the type described is a matter of routine to persons of ordinary skill and variations are manifestly possible; all that is required is to achieve firing above 800° C. with the avoidance of excessive rates of water vaporization and the avoidance of extreme temperature gradients, either of which can cause fracture.

Additionally, whereas a specific vibration rate and amplitude is specified, variations are manifestly possible, although filling rate may be compromised.

Further, whereas a cordierite monolith is mentioned, the invention can be utilized with other honeycomb type substrates.

Accordingly, the invention should be understood as limited only by the accompanying claims, purposively construed.

What is claimed is:

1. A method of forming a substrate having a plurality of parallel channels extending there through, the method comprising the steps of:

mixing from about 65 to 85% by weight of fly-ash with from about 15 to 35% by weight of a heat sensitive binder to form a granular material;

filling a selected plurality of the channels with the granular material; and consolidating the granular material through heat, the selected plurality being selected to produce a wall that separates the substrate into:

a first portion having a first plurality of the parallel channels extending there through; and a second portion having a second plurality of the parallel channels extending there through.

2. A method according to claim 1, wherein the granular material is sintered to produce the wall.

3. A method according to claim 1, wherein the granular material consists essentially of:

from 65 to 85% by weight of fly-ash comprising cenospheres, from 15 to 35% by weight of a heat sensitive binder selected from the group consisting of boric acid and anhydrous boron oxide.

4. A method according to claim 1, wherein the granular material consists essentially of:

from about 80% by weight of said fly ash;

about 20% by weight of said heat sensitive binder.

5. The method according to claim 1, wherein the binder is boric acid.

6. The method according to claim 1, wherein the granular material has a density of from 25 to 30 lb/ft$^3$.

7. The method according to claim 1, wherein the granular material has a median particle size of approximately 50 microns and a particle size ranging from 10 to 160 microns.

8. The method according to claim 1, wherein the filling step involves pouring the granular material into the selected plurality of the cells.

9. The method of claim 1, wherein said granular material is heated to between about 300° C. and 750° C. before filling the selected plurality of channels and fired to above about 850° C. after filling said selected plurality of channels.

10. The method of claim 9, wherein said firing is above 900° C.

11. The method of claim 10, wherein said firing is for at least 12 hours.

12. The method of claim 1, wherein said substrate comprises a catalytic converter.

* * * * *